Dec. 24, 1940.  F. GALLAGHER  2,226,426
STEAM APPLYING DEVICE
Filed Nov. 17, 1938
Fig. 1
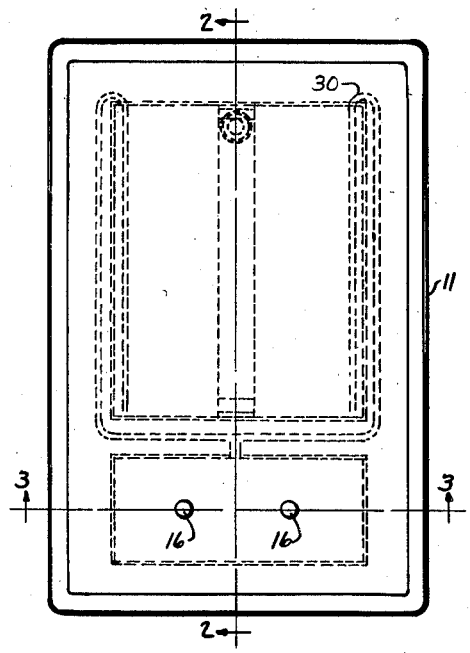
Fig. 2
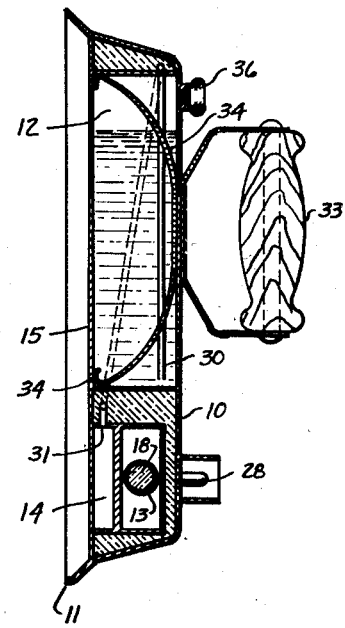
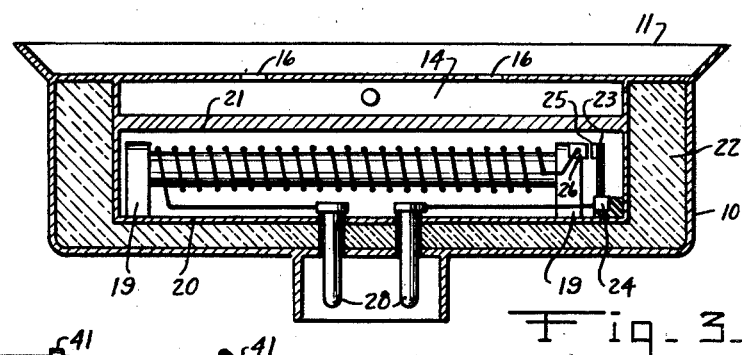
Fig. 3.
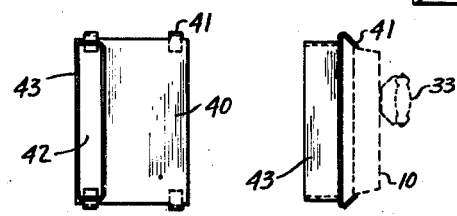
Fig. 4.  Fig. 5.
Inventor
FRANK GALLAGHER
By Francis J. Klempay
Attorney Patented Dec. 24, 1940

2,226,426

UNITED STATES PATENT OFFICE 2,226,426

STEAM APPLYING DEVICE

Frank Gallagher, Youngstown, Ohio

Application November 17, 1938, Serial No. 240,963

9 Claims. (Cl. 216—8)

This invention relates to apparatus for producing steam and more particularly to a portable device for generating and distributing live steam over papered surfaces for the purpose of loosening the paper prior to removal, of textile surfaces for the purpose of restoring the nap thereof, and for other uses which will become apparent as the description proceeds.

The primary object of the invention is the provision of a device for the purposes mentioned which is unitary and selfcontained and which requires only an electrical connection for its proper operation and use.

Another object of the invention is the provision of a device for the purposes described which embodies therein a container for the water from which the steam is to be generated, a flash steam generator, and means operable by manipulation of the supporting handle of the device for metering the flow of water from the container to the generator.

A further object of the invention is the provision of a device for the purposes described which will not emit water and which is operable in any position of use.

A still further object of the invention is the provision of an attachment for a device as described which materially increases the adaptability and usefulness of the device.

These and other objects and advantages of the invention will become apparent from a consideration of the accompanying drawings and the following detailed specification wherein there is specifically disclosed a preferred embodiment of the invention.

In the accompanying drawing where like numerals designate like parts throughout the various views:

Figure 1 is an elevation of a device constructed in accordance with the principles of my invention;

Figure 2 is a sectional view taken along the line 2—2 of Figure 1;

Figure 3 is a sectional view taken along the line 3—3 of Figure 1;

Figure 4 is a plan view of an attachment for directing the flow of steam from the generator along an edge of the device; and Figure 5 is an end view of the attachment of Figure 4 and showing the steam generating unit in dotted lines as supporting the attachment.

The apparatus of my invention consists essentially of an outer casing 10 provided with a flared edge 11 to engage the papered wall or other surface, a water chamber 12, a heating element 13 and a flash chamber 14 adapted to receive heat from the element 13 and water from the chamber 12 to generate the steam required to carry out the stated purposes for which the apparatus is intended. Spaced inwardly from the outer face of the casing 10 is the plate 15 which forms one wall of the water chamber 12 and one wall of the flash chamber 14. One or more apertures 16 are provided in the plate 15 at the chamber 14 to provide an outlet between the latter chamber and the space within the flared edge 11. In the normal use of the device the edge 11 is positioned against the wall or surface to which steam is to be applied and the plate 15 and edge 11 provide a thin chamber for the confinement of the live steam issuing through the apertures 16.

The heating element 13, which preferably consists of an electrical resistance, is carried by insulating rod 18 supported between suitable insulating supports 19 within the chamber 20. A heavy metallic wall 21 of good heat conducting material divides the chamber 20 and the flash chamber 14 and to prevent undue heat losses from the chamber 20, except to chamber 14, the front, side and top walls of the chamber 20 are insulated from the outer casing 10 and from the water chamber 12 by suitable insulation material 22 packed between the heating chamber 20 and the water chamber 12 and outer casing 10.

Inasmuch as the proper operation of a flash steam generator depends on the presence of substantial heat energy in the generating chamber it is necessary that the plate 21 and the chamber 14 be kept at a high temperature irrespective of any variation in the amount of the water being metered to the chamber. This is provided for in my construction by incorporating a thermostatic control in the heating chamber 20 which control may consist of a bi-metallic thermostatic element 23 one end of which is suitably anchored at 24 and the other end of which carries the contact 25 for engagement with and disengagement from a fixed contact 26. Contacts 25 and 26 are in circuit in series with the heating element 13 and the operation of the control is such that when a predetermined temperature is reached in the chamber 20 the contact 25 will be caused to move away from the contact 26 by the bi-metallic element 23 thereby breaking the heating circuit and discontinuing the supply of heat to the chamber 20. Current is supplied to the heating element 20 by the terminals 28 which extend from within the chamber 20 outwardly through the insulation 22 and the front wall of the outer casing 10 where they may be engaged by suitable connecting means carried with the current conducting cord as is well understood in the art. Suitable electrical insulation is provided between the terminals 28 and the casing for chamber 20 and the outer wall of casing 10. As shown, one of the terminals is connected with one end of the resistance heating element 13 and the other terminal is connected through the bi-metallic element 23 to the movable contact 25. Fixed contact 26 is electrically connected with the other end of the resistance element.

To conduct water from the reservoir 12 to the flash chamber 14 one or more tubes 30 may be provided, which tubes, as viewed in Figures 1 and 2, may connect with the chamber 14 at 31 and extend outwardly and upwardly outside of the reservoir 12, thence downwardly into the reservoir with their inlet ends positioned adjacent the bottom of the reservoir and the front face of the casing 10. The purpose of the specific direction taken by the tubes 30 is to enable substantially all the water in the reservoir 12 to be withdrawn into the flash chamber with the apparatus either in the vertical position as shown in Figures 1 and 2 or in a horizontal position with the edge 11 extending upwardly whereby the device is operable on both walls and ceilings.

A handle 33 is attached by any suitable means to the front wall of casing 10 and positioned within the reservoir 12 is the spring 34, a portion of which abuts against the front wall of casing 10 opposite the location of attachment of the handle 33. The front wall of casing 10 is somewhat flexible and the operation of the spring 34 is such that the wall is normally retained in outer flexed position. However, by pressing inwardly on the handle 33 the wall will be flexed inwardly and the subsequent reduction in volume of the reservoir 12 will force an amount of the water in the reservoir out through the tubes 30 and into the flash chamber 14. The amount of water so withdrawn from the reservoir will be determined by the pressure and the speed at which the pressure is exerted on the handle 33 and it has been found that after very little practice an operator may readily control the amount of water supplied to chamber 14 and consequently the amount of steam generated. The reservoir 12 is filled through a suitable filling cap 36.

The principal advantage and novelty of the apparatus described immediately above is that with the heating element electrically connected to a suitable source of current supply the apparatus is available for instant use and that the amount of steam generated may very readily be controlled simply by manipulation of the handle by which the apparatus is supported. Further, no steam whatever is generated when the apparatus is not in use, as when it is being temporarily laid aside pending the performance of other tasks by the operator. The quantity of water is thus conserved and no objectionable dripping results. When used to remove wall paper, for example, the operation of the device is as efficient when applied to ceilings as to side walls.

Figures 4 and 5 illustrate an attachment which may be applied to the device illustrated in Figures 1-3 for the purpose of reducing the effective width of the steam applying device whereby the device may be used to apply steam to restricted areas such as some times occur between the trim for doors or windows and the corners of a room. The attachment consists of a plate 40 which is adapted to be fitted over the flared edge 11 of the casing 10 and to be secured thereto by the spring clips 41. An opening 42 is provided along one edge of the plate 40 and an outwardly directed flange 43 is provided to project the opening outwardly from the adjacent face of a steam generating assembly. The location of the opening 42 and the flange 43 may obviously be varied depending on the specific uses to which the appliance is to be put. It should be apparent that by the use of the attachment described the appliance may be so modified that confined live steam may be applied to narrow surfaces having projections extending outwardly from the general plane of such surfaces.

The above specifically described embodiment of my invention should be considered as illustrative only as obviously many changes may be made therein without departing from the spirit or scope of the invention. For example, the principles involved may be applied to a portable device for supplying live steam to articles of clothing and other fabrics, such as upholstery, for cleaning and restoring the nap and in such devices other means than that specifically disclosed may be employed to direct or confine the steam on the article and to control the flow of water between the water reservoir and the steam generating chamber.

What I claim is:

1. A steam applying device comprising a support having a wall adapted to be maintained in spaced relation with an object, a steam generating chamber adjacent said wall on the opposite side of said wall from said object, a water chamber adjacent said wall, a wall of said chamber being flexible and a conduit connecting said water chamber and said steam generating chamber whereby flexure of said flexible wall will cause a quantity of water to be deposited in said steam generating chamber, and an aperture in said first mentioned wall interconnecting said last mentioned chamber with the space between the object and the first mentioned wall.

2. A steam applying device comprising a support, a water chamber carried by said support, a steam generating chamber carried by said support, means providing communication between said chambers comprising a U-shaped conduit extending both inside and outside of a wall of said water chamber, means to heat said steam generating chamber, one wall of said water chamber being flexible whereby flexure of the same will cause a quantity of water to flow through said conduit and be deposited in said steam generating chamber, and an aperture in said last mentioned chamber.

3. A device according to claim 2 further characterized by a manually engageable member constituting a portion of said support and operable by manual manipulation to flex said flexible wall.

4. A steam applying device comprising a support, a water chamber carried by said support, a steam generating chamber carried by said support, means providing communication between said chambers, means to heat said steam generating chamber, one wall of said water chamber being flexible whereby flexure of the same will cause a quantity of water to be deposited in said steam generating chamber, and an aperture in said last mentioned chamber.

5. A device according to claim 4 further characterized by a handle attached to said flexible wall whereby manipulation of the handle controls the amount of water entering said steam generating chamber.

6. A portable steam applying device comprising a casing having a steam generating chamber therein and an outer flanged edge adapted to engage a surface to which steam is to be applied, means providing communication between said chamber and the space within said flanged edge, and a removable plate adapted to be attached over said flanged edges, an opening in said plate and an outwardly directed peripheral flange about said opening.

7. A portable steam applying device comprising a plate having a peripheral flange extending outwardly from one side thereof, said plate adapted to be positioned adjacent a wall or other surface to which steam is to be applied with the flange in engagement with such wall or other surface, an opening in said plate for the passage of steam, and a removable plate adapted to be attached over the outer end of said flange, an opening in said removable plate and an outwardly directed peripheral flange about said last mentioned opening.

8. A portable steam applying device comprising a unitary assembly having a water reservoir, a steam generating chamber, means to heat said chamber, a handle for said assembly, means to control the flow of water from said reservoir to said chamber, said means being operative while the device is in operative engagement with the surface to which the steam is to be applied, and an outlet for said steam generating chamber opening in the direction of such surface.

9. A portable steam applying device comprising a unitary assembly having a water reservoir embodied therein, a flash boiler embodied therein, means to supply heat to said boiler, an outlet from said boiler opening outwardly from one side of said device, a handle on the other side of said device, means to meter the flow of water from said reservoir to said boiler, said means being operative while said assembly is in operative engagement with the surface to which steam is to be applied.

FRANK GALLAGHER.